United States Patent [19]

Dalton et al.

[11] Patent Number: 4,978,788

[45] Date of Patent: Dec. 18, 1990

[54] COMPOSITION AND USE OF THE COMPOSITION FOR THE EXTRACTION OF METALS FROM AQUEOUS SOLUTION

[75] Inventors: Raymond F. Dalton, Cheadle Hulme; John L. Leng, St. Albans, both of England

[73] Assignee: Imperial Chemical Industries PLC, London, United Kingdom

[21] Appl. No.: 281,078

[22] Filed: Dec. 8, 1988

Related U.S. Application Data

[63] Continuation-in-part of Ser. No. 863,031, May 14, 1986, abandoned.

[30] Foreign Application Priority Data

May 16, 1985 [GB] United Kingdom ............... 8512454
Jan. 15, 1986 [GB] United Kingdom ............... 8600838

[51] Int. Cl.$^5$ .................. C07C 251/32; C22B 15/00; C01B 31/16; C02F 1/42
[52] U.S. Cl. ........................... 564/265; 423/24; 423/DIG. 14; 252/184; 210/688; 210/912
[58] Field of Search ............. 75/101 BE, 117; 423/24, 423/DIG. 14; 252/184, 364; 564/301, 265; 210/660, 680, 688, 912

[56] References Cited

U.S. PATENT DOCUMENTS

| | | | |
|---|---|---|---|
| 3,224,873 | 12/1965 | Swanson | 423/24 |
| 3,428,449 | 2/1969 | Swanson | 423/24 |
| 3,655,347 | 4/1972 | Mattison et al. | 423/24 |
| 3,725,046 | 4/1973 | Hartlage et al. | 75/117 |
| 4,020,106 | 4/1977 | Ackerley et al. | 423/24 |
| 4,026,988 | 5/1977 | Wells et al. | 423/24 |
| 4,029,704 | 6/1977 | Anderson | 423/24 |
| 4,142,952 | 3/1979 | Dalton | 423/24 |
| 4,193,969 | 3/1980 | Fekete et al. | 75/101 BE |
| 4,231,888 | 11/1980 | Dalton | 423/139 |
| 4,258,016 | 3/1981 | Siemans et al. | 423/24 |
| 4,324,771 | 4/1982 | Barlow et al. | 423/DIG. 14 |
| 4,336,231 | 6/1982 | Dalton | 423/24 |
| 4,507,268 | 3/1985 | Kordosky et al. | 423/24 |
| 4,544,532 | 10/1985 | Kordosky et al. | 423/DIG. 14 |
| 4,582,689 | 4/1986 | Kordosky | 75/101 BE |

FOREIGN PATENT DOCUMENTS

| | | |
|---|---|---|
| 881273 | 1/1980 | Belgium . |
| 1130237 | 8/1982 | Canada . |
| 0085522 | 1/1983 | European Pat. Off. . |
| 2091794 | 5/1971 | France . |
| 2171162 | 2/1973 | France . |
| 2339675 | 1/1977 | France . |
| 2370696 | 11/1977 | France . |
| 2612505 | 3/1976 | Netherlands . |
| 110612 | 4/1977 | Poland . |
| 1322532 | 5/1970 | United Kingdom . |
| 1403792 | 2/1972 | United Kingdom . |
| 1537828 | 3/1975 | United Kingdom . |
| 1549615 | 10/1976 | United Kingdom . |

OTHER PUBLICATIONS

"Solvent Extractions Equilibira of Copper and Nickel with SME 529" Hydrometallurgy. 13(1984) 73–78—Elsevier Science Publishers B.V. Amsterdam—Printed in the Netherlands.

*Primary Examiner*—Gary P. Straub
*Assistant Examiner*—Steven Bos
*Attorney, Agent, or Firm*—Cushman, Darby & Cushman

[57] ABSTRACT

A composition for use in extracting copper values from aqeous solutions of metal salts which comprises one more o-hydroxyaryloximes containing at least 5 aliphatic or alicyclic carbon atoms which are strong metal extractants which, in 0.2 molar solution in an aliphatic hydrocarbon solution loaded with 50% of the theoreticl uptake of copper, will be in equilibrium with 0.1 molar solution of copper as copper perchlorate at a pH less than 1; and one or more branched chain aliphatic or aromatic-aliphatic alcohols containing 14 to 30 carbon atoms or aliphatic or aliphatic-aromatic esters containing 10 to 30 carbon atoms, wherein the ratio of the number of methyl carbon atoms to the number of non-methyl carbon atoms is higher than 1:5, and which is selected from the group consisting of highly branched isohexadecyl alcohol, highly branched isooctadecyl alcohol and a diester of 2,2,4-trimethyl-1,3-pentanediol; and wherein the weight ratio of A to B is in the range 10:1 to 1:3.

9 Claims, No Drawings

COMPOSITION AND USE OF THE COMPOSITION FOR THE EXTRACTION OF METALS FROM AQUEOUS SOLUTION

This application is a continuation-in-part of U.S. application Ser. No. 06/863,031, filed May 14, 1986, now abandoned.

This invention relates to an improvement in compositions and processes for extracting metals from aqueous solutions, especially solutions obtained by leaching ores with acids, using o-hydroxyaryloximes as extracting agents.

It is known to extract metals, especially copper, from aqueous solutions containing the metal in form of, for example, a sulphate salt by contacting the aqueous solution with a solution of an o-hydroxyaryloxime in a water immiscible organic solvent and then separating the solvent phase loaded with metal, i.e. containing a part of the metal in the form of a chelate compound with the o-hydroxyaryloxime. The metal can then be recovered from the metal loaded solvent phase by stripping with acid solutions followed, for example, by electrowinning.

The reaction leading to the metal chelate compound also forms acid and causes a lowering of the pH. This reaction is reversible and proceeds to an equilibrium point which will favour formation of the chelate compound as the pH is increased. The metal salt-containing aqueous solutions from which metal e.g. copper is to be extracted will frequently be leach liquors obtained by extracting metal ores with acid and will in some cases have a low pH. Since the amount of chelate compound formed at equilibrium is lower as the pH is decreased only those o-hydroxyaryloximes which have a strong chelating power will be able to achieve a high degree of extraction from those aqueous leach liquors having very low pH or high copper content.

The advantage of high copper extraction shown by these strongly chelating oximes is to some extent offset by the large amount of copper which remains as chelate in the solvent after stripping with acid of convenient strength. While this residual copper as chelate is not lost since it can be recycled to the extraction stage, a reduction in the amount of residual copper chelate would, in the absence of any comparable reduction in the degree of copper extraction from the aqueous solution, afford an improvement in the overall efficiency of the process.

In our UK Patent No 1549615 we show that the amount of copper removed in these oases from the solvent phase in the stripping stage is significantly increased if the solvent phase contains a defined phenol. Such compounds are sometimes called 'strip modifiers'.

In the above specification we also disclose that certain aliphatic alcohols, such as tridecanol have similar beneficial effects.

Modifiers will not only influence the strength of the extractant, but can also affect the hydrolytic stability, the selectivity of copper extraction over iron extraction, the level of entrainment, the kinetics of the extraction and stripping stages and the generation of crud. A suitable modifier will therefore often be the result of a compromise.

'Crud' is a term applied to undesirable extraneous matter formed at the organic-aqueous interface or in the organic phase in the settler compartment of mixer settlers used in the solvent extraction process. It is usually an oil-water emulsion stabilised by the presence of finely divided solid material that may be either alumino silicates present in the feed, or colloidal silica precipitated during the solvent extraction operation. It can accumulate in sufficient quantities to seriously reduce the working volume of a settler leading to flooding. Where large quantities are produced it has to be removed and the emulsion broken by centrifuging. Crud can also be a source of loss of reagent by aborption on the silicacious solids component which is discarded.

In solvent extraction operations employing banks of mixer settlers operated in a continuous fashion, it is inevitable that after the primary separation of the organic and aqueous phases in the settlers, there remains some entrainment of one phase in the other. This is in the form of minute droplets that are very slow to coalesce or settle and are thus carried through with the primary phase. In the case of droplets of organic material entrained in the aqueous phase this represent a major loss of extractant reagent from the plant, both in organic material entrained in the discarded raffinate from the extraction circuit and in organic material transferred to the electrolyte in the stripping stage. In the latter case the entrained organic material may cause further complications by interfering with the clean deposition of copper and may cause burning of the elctrodes. In the case of entrainment of droplets of aqueous in organic phase, this represents a means of physical transfer of unwanted metals such as iron present in the aqueous feed solution, that may outweigh the advantages of the high selectivity of an extractant reagent for copper over other metals. It is therefore seen to be of considerable advantage to maintain entrainment at as low a level as possible. Various physical means have been tried but it is also clearly a function of the reagent composition employed and there are distinct advantages in reagents which minimise formation of entrainment of one phase in another.

U.S. patent specification No. 4,507,268 and 4,544,532 describes the use of mixture of aldoxime and ketoxime with no or only low level of modifiers. Such mixtures will be advantageous in respect of crud formation. These formulations commercially known under the trade names Lix 864 (2 hydroxy 5 dodecyl benzaldoxime with 2 hydroxy 5 nonyl benzophenone oxime) and Lix 984 ( 2 hydroxy 5 dodecyl benzaldoxime with 2 hydroxy 5 nonyl acetophenone oxime) will however provide extraction with low Cu over Fe selectivity.

There is thus still a need for more efficient modifiers with good selectivity which furthermore will not favour formation of crud and avoid entrainment.

We have now found that the use of highly branched chain aliphatic or aliphatic-aromatic C-10 C-30 esters or C-14-C30 alcohols give unexpected benefits as strip modifiers. Good and unexpected selectivity for copper over iron can be achieved and the above disadvantage concerning crud formation and entrainment level can be overcome by using such compounds, particularly very highly branched derivatives.

It has also been found quite unexpectedly that the formulations in accordance with the present invention provide better hydrolytic stability than formulations based on certain mixture of aldoxime and ketoxime without modifier as claimed in U.S. Pat. No. 4,507,268.

Accordingly, our invention provides a composition for use in extracting metals from aqueous solutions of metal salts which comprises :

A. on or more o-hydroxyaryloximes containing at least 5 aliphatic or alicyclic carbon atoms which are strong metal extractants as hereinafter defined.

B. one or more branched chain aliphatic or aromatic-aliphatic alcohols containing 14 to 30 carbon atoms or esters containing 10 to 30 carbon atoms, the ratio of methyl carbon atoms to non-methyl carbon atoms being higher than 1 : 5, the weight ratio of A to B being in the range 10:1 to 1:3.

Preferably the methyl carbon atoms to non methyl carbon atoms ratio is higher than 1 : 3 and the weight ratio of A to B is 5:1 to 1:1. The esters contain preferably 14 to 25 carbon atoms and the alcohols 15 to 25 carbon atoms.

The composition may be dissolved in an organic solvent, which for the normal metal extraction process should be water immiscible.

A further aspect of the present invention is a process for extracting metal from aqueous solution by the steps of:

a. contacting the aqueous solution containing metal with a solution in an immiscible solvent of a composition according to the present invention;

b. separating the aqueous and solvent phases, the latter containing metal complex;

c. contacting the solvent phase with an aqueous mineral acid; and d. separating the solvent phase from the aqueous phase containing metal in the form of a salt of the mineral acid.

Preferably the metal is copper or nickel, more preferably copper itself.

o-hydroxyaryloximes generally of value for extracting metal values from aqueous solutions of metal salts are well known and include for example alkyl or alkoxysalicylaldoximes as described in Belgian Patent Nos. 796,835, substituted, e.g. by alkyl or alkoxy groups, o-hydroxyaryl alkyl ketoximes as described in British specification 1,322,532, German Offenlegungsschrift 2407200 and Belgian Patent No. 804,031, o-hydroxyarylbenzyl ketoximes as described in Belgian Patent No. 804,030, and o-hydroxybenzophenone oximes as described in U.S. Pat. Nos. 3,428,449 and 3,655,347. In order to confer adequate solubility of the oxime and its metal derivative in the organic solvents the oximes should contain groups, e.g. alkyl, alkylene or cycloalkyl groups containing at least three carbon atoms and preferably not more than 20 carbon atoms. The solubility is generally further enhanced by the use of mixtures of oximes. Preferred compounds contain C7-C15 alkyl groups.

Of the above o-hydroxyaryloximes only those which are strong metal extractants are useful in the process of the invention. These o-hydroxyaryloximes are defined as those which in 0.2 molar solution in an aliphatic hydrocarbon solution when loaded with 50% of the theoretical uptake of copper will be in equilibrium with a 0.1 molar solution of copper as copper perchlorate at a pH less than 1. In contrast o-hydroxyaryl ketoximes which are devoid of electron withdrawing substituents in the 3-position, examples which are described in British Specification 1,322,532, U.S. Pat. No. 3,428,449 and Belgian Patents Nos. 804030 and 804031, in the above test are usually in equilibrium at pH about 1.2 or higher and are not suitable for use in the present invention on their own, but they may be used in admixture with the compositions of the present invention.

Alkylphenols, as described in our UK Patent No 1,549,615 may also be present in amounts from 10 to 300% by weight of the oxime.

Particularly useful, owing to their ability to deal with aqueous solutions containing high copper concentrations and their rapid rates of metal transfer, are the alkyl salicylaldoximes especially wherein the alkyl groups are branched chain alkyl groups containing at least five carbon atoms and mixtures of these, for example 4-nonyl-salicylaldoximes and mixed 5-heptylsalicylaldoximes, and particularly mixtures of 2-hydroxy 5-nonyl-benzaldoximes, in which the components of the mixture differ in configuration of the branched chain nonyl group, derived by formylation and oximation from the mixed p-nonylphenols obtained by condensation of phenol with propylene trimer, and mixtures of 2-hydroxy-5-heptylbenzaldoximes, in which the components of the mixture differ in configuration of the heptyl group, similarly derived from phenol-heptylene condensate.

Also useful however are mixtures of strong o-hydroxy benzaldoximes of the type described above, and the weaker o-hydroxyarylketoximes of the type referred to earlier and described in U.S. Pat. No 3,428,449 and Belgian Patents Nos. 804030 and 804031. Such mixtures are described in European Publication No. 85522. The performance of these mixtures can also be suitably modified by the incorporation of the highly branched aliphatic or aliphatic-aromatic alcohols or esters of this invention.

As alcohols in these compositions and processes may be used either saturated or unsaturated aliphatic hydrocarbon alcohols or polyols containing 14 to 30, preferably 15 to 25 carbon atoms. The alcohols are preferably highly branched with the hydroxyl group being located approximately midway along the hydrocarbon backbone. Especially preferred for this application are the branched chain alcohols that may be made by condensation of short alcohols by the Guerbet process. Such alcohols are sometimes referred to as Guerbet alcohols. Optionally the alcohols may contain an aromatic group or other functional group, particularly an ester group.

Especially useful in these compositions are alcohols synthesised from highly branched precursors leading to very highly branched Guerbet alcohols containing a large number of terminal methyl groups.

It has been found that a particularly efficient modifier is the highly branched isohexadecyl alcohol or isooctadecyl alcohol the latter being 2-(1,3,3-trimethylbutyl)-5,7,7 trimethyl octanol.

As esters in these compositions and processes may be used either saturated or unsaturated aliphatic or aromatic-aliphatic esters containing from 10 to 30 carbon atoms. The esters may be polyesters, especially diesters. The esters are preferably highly branched. Optionally the esters may contain other functional group, more particularly a hydroxyl group.

In the context of this invention 'highly branched' means that the ratio of the number of methyl carbons to non methyl carbons is higher than 1:5.

Especially useful in these compositions and processes are esters derived from certain diacids, preferably branched diacids. As examples may be quoted 2,2,4-trimethyl-1,3-pentanediol diisobutyrate and the benzoic acid ester of 2,2,4-trimethyl-1,3-pentanediol monoisobutyrate. The latter esters are commercialy available.

Mixture of esters or alcohols with other modifiers or with other esters or alcohols according to the present invention may also be used advantageously.

The amount of oxime used will depend upon the concentration of metal salt in the aqueous solution and the plant design. It is preferred however to use from 5 g to 300 g of oxime per liter of organic solution. Higher concentrations afford organic phases of too high viscosity for convenient handling and lower concentrations involve the use of unnecessarily large volumes of solvent.

For use with aqueous solutions containing 1 g or more per liter of metal such as copper it is preferred to use 20 to 200 g of oxime per liter of organic solution in conjunction with an amount of alcohol or ester suitably from 10% to 200% of the weight of the oxime, and especially from 20% to 100%. The effect of the alcohol or ester is more marked the higher the concentration of oxime and comparatively lower proportions of the modifier with respect to the oxime are required to bring about a satisfactory improvement in strip efficiency when operating at high concentrations.

The first and second steps of the process may conveniently be carried out by bringing together the aqueous solution and the solution of the oxime in the organic solvent at a suitable temperature, usually ambient temperature, although somewhat higher temperatures may be used if operationally convenient, agitating or otherwise disturbing the mixture of liquids so that the area of the water-solvent interfacial layer is increased in order to promote complex formation and extraction, and then decreasing the agitation or disturbance so that the aqueous and solvent layers settle and can be conveniently separated. The process may be carried out in a batchwise manner or preferably continuously.

The amount of organic solvent to be used may be chosen to suit the volume of aqueous solution to be extracted, the concentration of metals, and the plant available to carry out the process. It is preferred, especially when operating the process continuously, to bring together approximately equal volumes of the organic solution and the aqueous solution.

The conditions, particularly pH values, under which first and second steps of the process are carried out are chosen to suit the metal or metals present in the aqueous solution. It is generally desirable that under the chosen conditions any other metals present should not form stable complex compounds with the oxime in order that substantially only the desired metal is extracted from the aqueous solution. Since formation of the complex compound may involve the liberation of acid, it may be necessary to add e.g. alkali during the process to maintain the pH within the desired range in which the metal complex is stable but it is generally preferable to avoid this, especially in a continuously-operated process. The process of the invention is especially suitable for use with copper since the metal forms a complex with o-hydroxyaryloximes which is stable at low pH values and by operating at pH below 3 copper can be extracted substantially free from iron, cobalt and nickel. As organic solvents there may be used any mobile organic solvent mixture of solvents which is immiscible with water and, under the pH conditions used, inert to water, and to the oxime, especially aliphatic, alicyclic and aromatic hydrocarbons and mixtures of any of these, particularly mixtures which have little or no aromatic hydrocarbon component, and halogenated particularly chlorinated hydrocarbons including, as solvents more dense than water, highly halogenated hydrocarbons such as perchloroethylene, trichloroethane, trichloroethylene and chloroform.

The third and fourth steps of the process may conveniently be carried out by bringing together the metal-bearing solution of the oxime in the organic solvent, obtained from the second stage of the process, and an aqueous solution of a mineral acid at a suitable temperature, usually ambient temperature, although somewhat higher temperatures may be used if operationally convenient, agitating or otherwise disturbing the mixture of liquids so that the area of the aqueous-solvent interfacial layer is increased in order to promote decomposition of the complex and recovery of the metal and then decreasing the agitation or disturbance so that the aqueous and solvent layer settle and then separating the layers. Suitable relative volumes of organic to aqueous phases are those conventionally used in metal extraction processes for example 1:1. In the stripping stage, such value will be typically 5:1. The process may be carried out in a batchwise manner or preferably continuously. The stripped organic layer, containing regenerated oxime, the modifier and some residual copper may be re-used in the first step of the process. The aqueous layer containing metal salt may be treated in any conventional manner, especially by electrolysis, to provide the metal.

The stripping acid is preferably sulphuric, suitable strengths being from 100 to 250g. per liter. After removal of a convenient part of the metal by electrolysis the recovered aqueous acid, containing residual metal salt, may be re-used in the third step of the process.

The invention is illustrated by the following non-limitative examples:

EXAMPLE 1

50 parts of a solution containing 50 g per liter of 2-hydroxy-5-nonyl benzaldoxime in Escaid 100 (an aliphatic Kerosenetype solvent) was stirred vigorously at 25 deg. Celsius with 100 parts of an aqueous solution containing 3.0 g per liter of copper as the sulphate at an initial pH of 2.0. After 15 minutes the stirring was stopped, the phases allowed to settle and a portion of the solvent phase removed and analysed for copper.

25 parts of the copper loaded organic phase were then stirred vigorously at 25 deg. Celsius for 15 minutes with 50 parts of an aqueous stripping solution containing 30 g per liter copper as the suplate and 150 g per liter of sulphuric acid. Again, the phases were allowed to settle and the organic phase analysed for copper.

The results showed that the organic phase following extraction contained 5.29 g per liter of copper and after stripping contained 3.35 g per liter of copper, indicating a recovery of copper of 1.94 g per liter of extractant solution used.

To demonstrate the improvement obtained by the incorporation of a long chain alcohol in the extractant composition the above experiment was repeated using an Escaid 100 solution containing 50 g per liter of 2-hydroxy-5-nonyl benzaldoxime and 25 g per liter of a highly branched iso-octadecyl alcohol (ex. Hoechst of Germany). The copper content of the organic phase after extraction was 5.01 g per liter and after stripping it was 2.29 g per liter, indicating a copper recovery of 2.72 per liter of extractant solution used, this being an increase of 40% over the recovery in the absence of the iso-octadecyl alcohol.

EXAMPLE 2

A pilot trial was carried out using a real mine feed solution which was fed to a small solvent extraction plant comprising two extraction mixer settlers and two strip mixer settlers arranged in series with counter current flows of organic and aqueous phases through the extraction and stripping stages. The aqueous feed solution from a dump leaching operation contained a variable concentration of metals during the several week period of the trial, the concentration of copper being between 2.0 and 4.5 g per liter, of iron being from 22 to 30 g per liter at a pH of 1.6. Stripping was carried out using an aqueous solution containing 30 g per liter of copper and 165 g per liter of sulphuric acid. The organic phase comprised an 8% by volume solution of a composition containing 50% by weight 2-hydroxy-5-nonyl benzaldoxime, 25% by weight iso-octadecyl alcohol, the balance being Escaid 100. The organic diluent was Kermac 470 B, another type of high flash point Kerosene commonly used as diluent in solvent extraction processes.

The organic:aqueous phase ratio in extraction stages was between 1.0 and 1.25 and in stripping was 6.3 to 6.6 overall, but by recycling the aqueous phase was arranged to be approximately 1.0 in the mixer. In both extraction stages and the first stripping stage the organic extractant solution formed the continuous phase, but in the second strip stage the aqueous solution formed the continuous phase during mixing. The mean temperature during the course of the trial was 23 deg. Celsius.

Samples were taken each day of all streams exiting the extraction and strip stages and measurements made of the level of one phase entrained in the other. It is extremely important to maintain low levels of entrainment because entrainment of organic in the aqueous phase reads to loss of the extractant from the system, and entrainment of aqueous feed in the organic stream proceeding to stripping represents a means by which undesired metals such as iron can be carried over to the electrolyte from which copper is subsequently removed by electrowinning.

The entrainment levels, based on the average of 14 or more measurements for each stream were as follows: All figures are parts per million by volume.

Aqueous in organic stream from 1st extractant stage 98 ppm

Aqueous in organic stream from 2nd strip stage 26 ppm

Organic in aqueous stream from 2nd extraction stage 40 ppm

Organic in aqueous stream from 1st strip stage 14 ppm

Entrainment levels of aqueous in the organic stream exiting the first extraction stage of greater than 1000 ppm have often been recorded when operating with an extractant solution comprising an 8% solution in Kerosene (Kermac 470 B) of a composition containing 2-hydroxy-5-nonyl benzaldoxime in admixture with 5-nonyl phenol in approximately 1:1 ratio by weight.

There is clearly an advantage for the composition of the invention described here as the organic system exiting the first extraction stage is passed to the stripping circuit and represents a means of transfer of unwanted iron the copper electrolyte.

During the course of this trial measurements were also made of the depth of interfacial sludge that accumulated, in particular in the first extraction stage. Using the composition of this invention described in this example, the depth of this material was found to approximately 10cm. In a similar trial using an extractant solution based on a formulation containing 2-hydroxy-5-dodecyl benzaldoxime and tridecyl alcohol in approximately 2:5:1 ratio by weight, the amount of sludge measured at the same point in the settler of first extraction stage was found to extend to a depth of 25cm.

EXAMPLE 3

In order to compare the copper over iron selectivity of a composition of this invention with the selectivity of a known composition containing tridecyl alcohol, the following experiment was carried out.

Solutions in Escaid 100 were prepared containing 9% by volume of two different extractant compositions. The first extractant composition was a formulation containing 50% by weight of 2-hydroxy-5-nonyl benzaldoxime, 25% by weight of iso-octadecyl alcohol, the balance being Escaid 100. The second extractant composition was a formulation containing 50% by weight of 2-hydroxy-5-nonyl benzaldoxime, 25% by weight of tridecyl alcohol, the balance being Escaid 100.

A portion of each extractant solution was stirred vigorously at 25 deg. Celsius with an equal volume of an aqueous solution containing 3.0 g per liter copper and 3.0 g per liter ferric iron as their sulphates at a pH of 2.0. The dispersions were sampled after 2 minutes and again after 15 minutes stirring, 2-3 minutes being a typical mean residence time in the mixer of commercial operations, and 15 minutes being long enough to establish full equilibrium.

The organic and aqueous phases were separated and the organic phase analysed for iron by atomic absorption spectrophotometry. The amount of iron co-extracted with the copper after 2 minutes was found to be 55 mg per liter in the case of the composition containing tridecyl alcohol but only 10mg per liter for a composition of this invention, in this case containing iso-octadecyl alcohol. After 15 minutes stirring the level of iron in the solution containing the tridecyl alcohol modified reagent was 88 mg per liter while that in the solution containing oxime modified with iso octadecyl alcohol was again only 10 mg per liter.

EXAMPLE 4

A number of laboratory scale mixer settler units were set up, each consisting of a mixer box of volume 560 cm3 from which the aqueous/organic dispersion overflowed into a settler compartment having a depth of 35 cm. Organic and aqueous streams were fed in at the base of the mixer and agitated by a six vaned impeller of diameter 25 mm which was rotated at 1100 revolutions per minute. A baffle was employed such that dispersion overflowing from the mixer was introduced at a point midway between the top and the bottom of the settler. Another baffle was placed partway along the length of the settler to provide an effective settler volume equivalent to a flow of 61 liters per square meter per minute.

A number of extractants formulations were made up which each contained 50 parts by weight of 2-hydroxy-5-nonyl-benzaldoxime in addition to modifiers as follows: Extractant A 25 parts isooctadecyl alcohol Extractant B 25 parts isohexadecyl alcohol Extractant C 30 parts 2-octyl dodecanol Extractant D 17 parts tridecanol In each case the composition was made up to 100 parts by weight by the addition of Escaid 100 (high flash point kerosene). The amount of modifier used in extractant compositions B, C and D was chosen so as to give a reagent with the same extractive strength and stripping characteristics as extractant A. Solutions were prepared containing 10% by volume of each of these extractant compositions in Chevron Ion Exchange Solvent ( a high flash point Kerosene used as carrier in solvent extraction processes). A different reagent solution was pumped to each mixer settler at a rate of 45 ml/min together with 45 ml of a mine solution. The mine solution used was common to all four mixer settlers and was obtained from a leaching operation carried out at a mine site in Arizona, USA. It contained approximately 2 g/ liter copper at pH 2. The mixer settlers were run continuously in runs lasting at least six hours. The organic phases were collected in receivers from which they were recycled to the appropriate mixer settler. The spent aqueous solutions were run to drain after one passage through the mixer settlers. During the course of these runs, a number of samples were taken of both the organic phase and the aqueous phase near to the point at which these phases exited to settler. These samples were then centrifuged in specially designed graduated vessels to determine the levels of entrainment of both organic in aqueous and aqueous in organic. Two series of experiments were carried out. In the first; steps were taken at start up to ensure that the organic reagent solutions formed the continuous phase in the mixers. In the second series, the aqueous feed formed the continuous phase. The entrainment levels obtained, based on the means of several measurements are tabulated below ( O=organic, A=aqueous).

| Ex-tractant Composition | Modifier | Entrainment level in ppm by volume | | | |
|---|---|---|---|---|---|
| | | For organic continuous dispersion | | For aqueous | |
| | | O in A | A in O | O in A | A in O |
| A | isooctadecyl alcohol | 154 | 865 | 45 | 194 |
| B | isohexadecyl alcohol | 196 | 800 | 27 | 183 |
| C | 2-octyl dodecanol | 280 | 1175 | 153 | 1813 |
| D | tridecanol | 204 | 1250 | 190 | 400 |

It is clearly evident from the data that considerably lower levels of entrainment are obtained where the modifier is a highly branched C16 or C18 alcohol, compared to the slightly branched C20 alcohol and the partially branched but lower molecular weight C 13 alcohol. Particularly low level of aqueous in organic entrainment are obtained with formulations A and B when the mixer is operated with aqueous forming the continuous phase, thus minimising physical transfer of unwanted metals such as iron present in the aqueous feed solution. It is also noted that particularly low levels of entrainment of organic in the aqueous are obtaiend with formulations A and B, employing the highly branched alcohol as modifier. This is a considerable benefit because entrainment of organic reagent solution in the spent aqueous phase, which is subsequently discarded, represents a major source of loss of reagent from the system and is one of the major running costs in a solvent extraction operation.

EXAMPLE 5

A number of experiments were carried out using mixer settlers as described in Example 4. The reagent solutions used were 10% solutions by volume of various formulations made up in Chevron Ion Exchange Solvent. Each of the formulations used contained 50 parts by weight of 2-hydroxy-5-nonyl benzaldoxime, a modifier as tabulated below plus Escaid 100 to make up to 100 parts by weight. The modifiers used in the various compositions were as follows Composition A contained 25 parts by weight of isooctadecyl alcohol Composition B contained 30 parts by weight of 2-octyl dodecyl alcohol Composition C contained 30 parts by weight of a highly branched ester of formula 2,2,4-trimethyl-1,3-pentane diol diisobutyrate Composition D contained 40 parts by weight of methyl laurate, a straight chain fatty ester The amount of modifier incorporated into each of the compositions B, C and D was such as to give a composition with the same extractive strength for copper as composition A. Each of these reagent solutions was pumped to a different mixer settler at a rate of approximately 45 ml per minute. The aqueous feed fed to each mixer settler was a leach solution from a mine known to produce severe crud problems in its solvent extraction plant. This particular mine feed solution contained approximately 3.0 g per liter of copper and 30 g per liter ferric ion at a pH of 2. The aqueous feed was pumped to each mixer settler and a rate of crud generation ascertained over the course of each experiment.

The mixer settlers were run continuously in runs lasting at least six hours. The organic phases were collected in receivers from which they were recycled to the appropriate mixer settler. The spent aqueous solutions were run to drain after one passage through the mixer settlers. During the course of the runs a number of samples were taken of both the organic and the aqueous phase near to the point at which these phases exited the settler. These samples were then centrifuged in especially designed graduated vessels to determine the levels of entrainment of both organic in aqueous and aqueous in organic.

Two series of experiments were carried out. In the first steps were taken at start up to ensure that the organic reagent solutions formed the continuous phase in the mixers. In the second series, the aqueous feed formed the continuous phase. The entrainmenet levels obtained, based on the means of several measurements are tabulated below (O=organic, A=aqueous) Levels of entrainment (ppm by volume) and rate of crud generation (mm/hr) for various reagent compositions.

| Extractant composition | For organic continuous dispersion | | |
|---|---|---|---|
| | Entrainment (ppm) | | Rate of crud generation |
| | O in A | A in O | |
| A | 87 | 361 | 1.96 |
| B | 313 | 792 | 3.4 |
| C | 53 | 25 | 0.57 |
| D | 300 | 1125 | 13.6 |

| Extractant composition | For aqueous continuous dispersion | | |
|---|---|---|---|
| | Entrainment (ppm) | | Rate of crud generation |
| | O in A | A in O | |
| A | 107 | 232 | 0.93 |
| B | 50 | 350 | 5 |
| C | 94 | 50 | 1.0 |
| D | 360 | 3000 | 11.5 |

These data demonstrate that in the case of both the alcohol modifiers and the ester modifiers the highly branched compounds are generally superior as modifiers with respect to the levels of entrainment produced. It is quite evident that the rate of build up of undesirable crud is considerably less in the case of formulations A and C employing higly branched modifiers than in the case of B and D where the modifier contain linear alkyl chains. In addition it is noted that ester composition C is generally superior to the alcohol composition B.

EXAMPLE 6

100 parts of a solution containing 50 g per liter of 2-hydroxy-5-nonyl benzaldoxime in Escaid 100 (an 80% aliphatic Kerosene type solvent) was loaded to its maximum loading capacity of copper by stirring vigorously at 25 deg C for 5 minutes with a solution containing 10 g per liter of copper, buffered at pH 4.5 by the addition of 54 g per liter of sodium acetate. The phases were allowed to separate and the organic phase found by analysis to contain 6.0 g per liter of copper. 50 parts of the copper loaded extractant solution were shaken vigorously at 25 deg C for 2 minutes with 50 parts of an aqueous strip solution simulating a spent electrolyte recovery solution. This contained 30 g per liter of copper, added as the sulphate, and 150 g per liter of sulphuric acid. After shaking, the phases were allowed to settle, the aqueous solution run off and replaced by a fresh 50 parts of strip solution. Shaking was continued as before and the above procedure repeated until the organic phase had been contacted with four separate portions of strip acid. A portion of the organic phase was then removed for analysis and found to contain 3.3 g per liter of copper. The above experiment was repeated using an extractant solution containing 50 g per liter of 2-hydroxy-5-nonylbenzaldoxime and 50 g per liter of 2,2,4-trimethyl-1,3-pentane diol diisobutyrate. It was found that after four contacts with strip acid the copper loading in the organic phase had been reduced to 1.47 g per liter, a marked improvement in stripping.

EXAMPLE 7

A solution (I) was prepared containing 25 g per liter of 2-hydroxy-5-nonylbenzaldoxime and 25 g per liter of 4-nonyl phenol in Escaid 100. Such a composition is commonly used in commercial operations for the solvent extraction of copper. An aqueous solution (II) was prepared containing 3.0 g per liter of copper and 30 g per liter of ferric iron as their respective sulphates, with a small amount of sulphuric acid to give a pH of 2.0. 80 parts of the extractant solution (I) were equilibrated by stirring vigorously for 15 minutes at 25 deg C with 80 parts of aqueous solution (II) after which the solutions were separated and a portion of the metal bearing organic solution (I) set aside for analysis. 40 parts of this part-loaded organic solution were given a second contact with aqueous feed by stirring for 15 minutes with another 40 parts of solution II. Again the phases were separated and a portion of the organic solution set aside for analysis. In another experiment an extractant solution (III) was prepared containing 25 g per liter of 2-hydroxy-5nonyl benzaldoxime and 15 g per liter of 2,2,4-trimethyl-1,3-(pentane diol diisobutyrate. This ratio of oxime to modifier was chosen as it gives the same copper transfer properties (strip performance) as solution (I). The above experiment was repeated, portion of solutions (III) being equilibrated twice with fresh portions of solution (II). Again portions of the organic phase were set aside for analysis after each contact. The various samples of organic solutions were filtered twice through Whatman filter paper to removed any entrained aqueous and then analysed to determine the amount of copper and iron present in each. Iron was determined directly by atomic absorption spectrophotometry of the organic solutions. Copper was determined by stripping it into aqueous solution by several contacts with 300 g per liter sulphuric acid followed by neutralisation, addition of potassium iodide and titration of the liberated iodine with standard thiosulphate solution. The analytical results are tabulated below together with results obtained using as modifiers tridecanol (IV), isooctadecyl alcohol (V), a mixture of 2 hydroxy-5-dodecyl benzaldoxime and 2 hydroxy-5-nonyl benzophenone oxime available commercially under the trade name Lix 864 (VI) and a mixture of 2 hydroxy-5-dodecyl benzaldoxime and 2-hydroxy-5-nonyl acetophenone oxime (VII) available under the trade name Lix 984.

| Reagent composition | Analysis of organic phase | | | | | |
|---|---|---|---|---|---|---|
| | 1st contact | | | 2nd contact | | |
| | Cu g/l | Fe mg/l | Cu/Fe ratio | Cu g/l | Fe mg/l | Cu/Fe ratio |
| I | 2.78 | 54 | 52 | 3.01 | 7.77 | 386 |
| III | 2.756 | 13.0 | 213 | 3.02 | 2.5 | 1210 |
| IV | 2.783 | 19.1 | 147 | 3.02 | 4.1 | 736 |
| V | 2.80 | 16.0 | 175 | 3.02 | 3.1 | 976 |
| VI | 2.77 | 120 | 23 | 3.024 | 92 | 33 |
| VII | 2.726 | 48 | 57 | 3.011 | 25 | 120 |

This clearly demonstrate that by replacement of the nonyl phenol modifier with 2,2,4-trimethyl-1,3-pentane diol diisobutyrate , a considerable improvement is obtained in the ratio of copper to iron extracted. Similarly a formulation containing the alcohol modifier V in accordance with this invention provides better selectivity than prior art tridecanol or mixtures of aldoxime and ketoxime.

We claim:
1. A composition for use in extracting copper values from aqueous solutions of metal salts which comprises
   (A) one or more o-hydroxyaryloximes containing at least 5 aliphatic or alicyclic carbon atoms which are strong metal extractants which, in 0.2 molar solution in an aliphatic hydrocarbon solution when loaded with 50% of the therotetical uptake of copper, will be in equilibrium with 0.1 molar solution of copper as copper perchlorate at a pH less than 1; and
   (B) one or more branched chain aliphatic or aromatic-aliphatic alcohols containing 14 to 30 carbon atoms or aliphatic or aliphatic-aromatic esters containing 10 to 30 carbon atoms, wherein the ratio of the number of methyl carbon atoms to the number of non-methyl carbon atoms is higher than 1:5, and which is selected from the group consisting of highly branched isohexadecyl alcohol, highly branched isooctadecyl alcohol and a diester of 2,2,4,-trimethyl-1,3pentanediol; and
   wherein the weight ratio of A to B is in the range 10:1 to 1:3.
2. The composition of claim 1 in which component A is an oxime which contains from 7 to 15 aliphatic or alicyclic carbon atoms.
3. The composition of claim 1 which is in solution in a water immiscible organic solvent.
4. The composition of claim 1 in which component B is an alcohol or ester wherein the ratio of the number of methyl carbon atoms to the number of non-methyl carbon atoms is higher than 1:3.

5. The composition of claim 1 wherein component B is 2-(1,3,3-trimethyl butyl)-5,7,7-trimethyl octanol.

6. The composition of claim 1 wherein component B is a diester which contains 14 to 25 carbon atoms.

7. The composition of claim 1 wherein component B is 2,2,4-trimethyl-1,3-pentanediol diisobutyrate.

8. The composition of claim 1 in which the branched chain ester is the benzoic acid ester of 2,2,4-trimethyl-1,3-pentanediol monoisobutyrate.

9. A composition for use in extracting copper values from aqueous solutions of metal salts which comprises (A) one or more o-hydroxyaryloximes containing at least 5 aliphatic or alicyclic carbon atoms which are strong metal extractants which, in 0.2 molar solution in an aliphatic hydrocarbon solution when loaded with 50% of the theoretical uptake of copper, will be in equilibrium with 0.1 molar solution of copper as copper perchlorate at a pH less than 1; and (B) one or more branched chain aliphatic or aliphatic-aromatic esters containing 10 to 30 carbon atoms, wherein the ratio of the number of methyl carbon atoms to the number of non-methyl carbon atoms is higher than 1:5, and which is a diester of 2,2,4-trimethyl-1,3-pentanediol; and wherein the weight ratio of A to B is in the range 10:1 to 1:3.

* * * * *